US010464141B2

(12) United States Patent
Haimer et al.

(10) Patent No.: US 10,464,141 B2
(45) Date of Patent: Nov. 5, 2019

(54) COLLET CHUCK WITH SPECIAL INTERACTION BETWEEN THE COLLET AND THE CLAMPING NUT (71) Applicant: Haimer GmbH, Igenhausen (DE)

(72) Inventors: Franz Haimer, Hollenbach (DE); Lothar Kirmayer, Adlkofen (DE)

(73) Assignee: HAIMER GMBH, Igenhausen (DE)

( * ) Notice: Subject to any disclaimer, the term of this patent is extended or adjusted under 35 U.S.C. 154(b) by 53 days.

(21) Appl. No.: 15/610,118

(22) Filed: May 31, 2017

(65) Prior Publication Data

US 2017/0348777 A1 Dec. 7, 2017

(30) Foreign Application Priority Data

Jun. 1, 2016 (DE) .................. 10 2016 110 087

(51) Int. Cl.
*B23B 31/20* (2006.01)
*B23B 31/113* (2006.01)

(52) U.S. Cl.
CPC ............ *B23B 31/20* (2013.01); *B23B 31/113* (2013.01); *B23B 2231/2005* (2013.01);
(Continued)

(58) Field of Classification Search
CPC ..... B23B 31/20; B23B 31/201; B23B 31/113; B23B 2231/20; B23B 2231/2008;
(Continued)

(56) References Cited

U.S. PATENT DOCUMENTS 3,365,204 A * 1/1968 Benjamin ............... B23B 31/20
279/47
3,521,896 A * 7/1970 Matsumoto ........... B23B 31/006
279/102
(Continued)

FOREIGN PATENT DOCUMENTS

CH 511092 A * 8/1971 ........... B23B 31/113
DE 867340 C * 2/1953 ............ B23B 31/20
(Continued)

OTHER PUBLICATIONS

German search report dated Mar. 2, 2017 in parent application DE102016110087.0.

*Primary Examiner* — Eric A. Gates
*Assistant Examiner* — Chwen-Wei Su
(74) *Attorney, Agent, or Firm* — Polson Intellectual Property Law, PC; Margaret Polson; Christopher Sylvain (57) ABSTRACT A collet chuck for clamping a tool shank, comprising a chuck body, a collet and a multi-part clamping nut consisting of a clamping ring and a threaded section rotatably connected to each other via rolling elements, otherwise connected in an interlocking manner, wherein the clamping ring and the collet comprise interlocking coupling elements designed such that the collet can be inserted into the collet housing through the central opening, facing away from the chuck body, of the clamping ring held on the chuck body, while the coupling elements move past each other, and then the coupling elements can be brought into engagement with each other by rotating the clamping ring relative to the collet, so that the clamping ring can transmit the forces applied to it by the threaded section during tightening to the collet via the coupling element and can drive the collet into the chuck body.

14 Claims, 9 Drawing Sheets (52) U.S. Cl.
CPC ..... *B23B 2240/04* (2013.01); *B23B 2260/008* (2013.01); *Y10T 279/17299* (2015.01); *Y10T 279/17538* (2015.01); *Y10T 279/32* (2015.01)

(58) Field of Classification Search
CPC ......... B23B 2231/2005; B23B 2240/04; Y10T 279/17411; Y10T 279/17495; Y10T 279/17529; Y10T 279/17538; Y10T 279/17299; Y10T 279/17504; Y10T 279/32
See application file for complete search history.

(56) References Cited

U.S. PATENT DOCUMENTS

| | | | | |
|---|---|---|---|---|
| 3,671,050 | A * | 6/1972 | Andersson | B23B 31/20 279/47 |
| 3,726,532 | A * | 4/1973 | Zeilinger | B23B 31/20 279/52 |
| 5,667,228 | A * | 9/1997 | Fabris | B23B 31/113 279/143 |
| 9,669,536 | B2 * | 6/2017 | Ito | B25F 5/02 |
| 2016/0221086 | A1 * | 8/2016 | Haimer | B23B 31/20 |

FOREIGN PATENT DOCUMENTS

| | | | | |
|---|---|---|---|---|
| DE | 1477757 | A1 * | 10/1969 | ............. B23B 31/20 |
| DE | 2013229 | A | 10/1970 | |

* cited by examiner

COLLET CHUCK WITH SPECIAL INTERACTION BETWEEN THE COLLET AND THE CLAMPING NUT

CROSS REFERENCE APPLICATIONS

This application is a non-provisional application claiming the priority from German application no. 10 2016 110 087.0 filed Jun. 1, 2016, which is hereby incorporated by reference for all purposes.

BACKGROUND

Collet chucks are known from the state of the art in various embodiments.

To hold a tool shank by means of such a collet chuck in a press fit, first, a suitable collet is inserted in the chuck body, the tool receiver of which has an interior diameter suited to the diameter of the tool shank.

The collet, at its external circumference, has an external cone and is inserted into a collet housing of the chuck body, which has a complementary internal cone.

Then that chuck is driven into the chuck body usually with the aid of a clamping nut configured as a sleeve nut. For this purpose, the clamping nut, with its internal thread, is screwed onto a corresponding external thread of the chuck body. In the region of its central opening it comes into contact with the collar of the collet and thus exerts pressure on the collet.

Centering and precise positioning of the collet is achieved essentially by the interaction of the external cone of the collet and the internal cone of the tool chuck. In addition, the contact surfaces of the clamping nut and the collar of the collet contacting each other are usually also conically shaped to achieve a certain centering action also at this point. It has been shown, however, that the strong friction arising during tightening of the clamping nut as the clamping nut interacts with the collet causes problems, when excellent concentricity is to be reproducibly achieved.

To achieve better reproducible concentricity, collet chucks have been suggested in which the clamping nut acts on the collet via a rolling bearing so that such sliding frictional forces with their attendant negative effects would not arise between the clamping nut and the collet during tightening of the clamping nut.

A drawback with this type of collet chucks is that usually the collet and the clamping nut each form a unit so that the collet and the clamping nut cannot be separated from each other with reasonable effort during a tool change. To exchange one collet for a different collet which is needed for clamping the specific tool required, the entire unit consisting of clamping nut and collet must then be exchanged in each case. It is, however, much more cost intensive to have to stockpile diverse units consisting of collet and clamping nut than to simply stockpile various collets.

Due to the above it has already been suggested to design the unit consisting of collet and clamping nut in such a manner that the collet can be disengaged from the clamping nut after complete removal of the clamping nut from the chuck body. However, this takes an unnecessary amount of time during tool change, since it is not sufficient simply to loosen the clamping nut, instead it has to be completely unscrewed.

In view of the above, the problem underlying the invention is to provide a collet chuck in which a quick exchange of only the collet is ensured in spite of the connection of the collet with the clamping nut via a rolling bearing.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

What is suggested is a collet chuck for clamping a tool shank, comprising a chuck body, a collet and a multi-part clamping nut consisting of a clamping ring and a threaded body. The clamping ring and the threaded section are rotatably connected to each other via a rolling bearing, otherwise connected in an interlocking manner. This dispenses with the necessity of a relative movement between the clamping nut, or its clamping ring, and the collar of the collet, which is subject to sliding friction and thus only affords little precision. Instead, the clamping nut is subdivided hereby. Its clamping ring no longer needs to move with respect to the collet during tightening of the clamping nut. The necessary relative movement is rather performed within the rolling bearing between the threaded section of the clamping nut and its clamping ring. It does not lead to a compromise of the concentricity of the collet since the rolling bearing per se can be manufactured with high precision, and moreover the frictional forces are substantially reduced so that, during driving in, the centering action caused by the cone responsible for closing the collet is not compromised.

According to the present invention, the clamping ring and the collet have coupling elements in interlocking engagement. They are designed such that the collet, when it assumes one of a plurality of certain rotary positions relative to the clamping ring, can be inserted into the collet housing through the central opening, facing away from the chuck body, of the clamping ring held on the chuck body, while the coupling elements move past each other in the direction of the longitudinal axis L of the collet chuck. The coupling elements are designed such that they can be brought into engagement with each other by a subsequent rotation of the clamping ring relative to the collet. By these means, the clamping ring can transmit the forces applied to it by the threaded section during tightening via the coupling element to the collet and can drive the collet into the chuck body.

In this way, quick exchange of the collet is possible, because it is no longer necessary to completely threadingly disengage the clamping nut from the chuck body to exchange the collet. Instead, it is sufficient to loosen the clamping nut, then to rotate the clamping ring—preferably by less than 45°—to bring the coupling elements out of engagement, and then to withdraw the collet through the central opening of the clamping nut still present on the chuck body. The clamping nut can be completely removable from the chuck body. The crucial thing is, however, that in each case it does not have to be completely removed from the chuck body.

This is advantageous, in particular, when the clamping nut is not screwed onto the chuck body by means of a simple thread, but through the interposition of rolling elements.

Herein, the rolling bearing formed between the clamping nut and the chuck body does not have to be opened to change the collet.

Also, by having the clamping nut remain permanently on the chuck body, it is possible for the first time to reliably seal the threaded section of the clamping nut and optionally also the rolling bearing.

Because it is no longer necessary to completely remove the clamping nut from the chuck body in order to exchange the collet the concentricity is improved, since the wear and tear on the thread are substantially reduced.

In the depicted embodiment, the coupling elements are designed such that the threaded section also transmits forces via the coupling elements to the collet during loosening, which release the collet from the collet housing. This enables the use of collets and collet housings with a smaller cone tip angle, in other words, collets that are not easily released from the conical seat by simply loosening the clamping nut (without tensile forces being transmitted to the collet). Due to the friction, the forces necessary for releasing the collet can be the same or even greater than the forces necessary for clamping.

The use of smaller cone tip angles—preferably ≤10°, ideally ≤7.5°—enables the collets to be particularly firmly tightened with a predetermined tightening torque and thus ensures particularly high-torque fixing of the tool shank. Moreover, excellent centering and thus excellent concentricity can thus be achieved.

Ideally the coupling elements can be brought into and out of engagement with each other without the use of tools for the installation of the collet in the chuck body and for removing it from the same. The only operation still requiring a tool will then be the tightening and loosening of the clamping nut, otherwise the collet exchange can be performed without the use of a tool, which makes it substantially simpler.

It is particularly advantageous for the coupling elements to form at least one bayonet fixture.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

FIG. 1 and FIGS. 12, 13, 14 show the collet chuck 1 as a whole. As illustrated, the collet chuck 1 consists of a metal chuck body 2, a metal collet 3 and a multi-part clamping nut 4.

Figure 1:
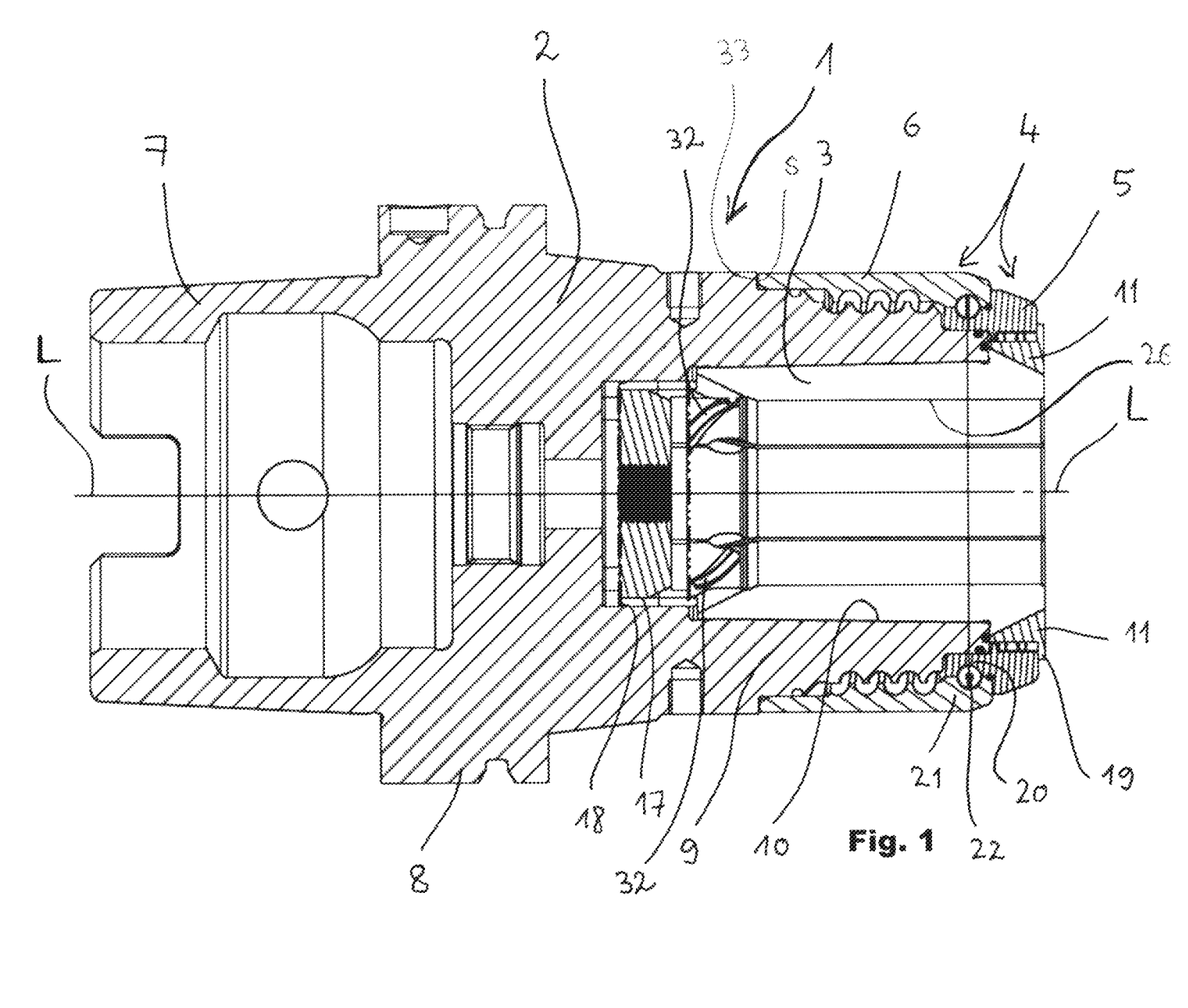
FIG. 1 is a sectional view of an embodiment of the collet chuck according to the present invention along its longitudinal axis L.

The chuck body 2 has a coupling section 7 for coupling the chuck body to a machine tool. The coupling section has the design of a hollow shaft coupling, as an alternative it has, for example, the design of a steep angle taper coupling.

Moreover, the chuck body 2 usually has a flange 8 which a gripper can grasp for automatic tool change. Finally, the chuck body 2 has a sleeve part 9. The sleeve part 9 comprises a collet housing 10.

Figure 7:
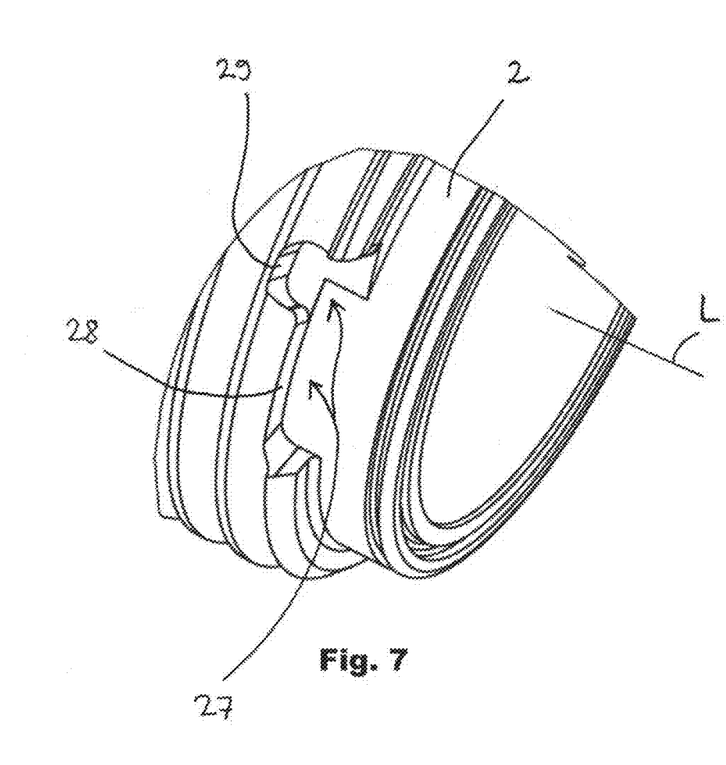
FIG. 7 shows an enlarged detail of the chuck body to illustrate the recess of the chuck body.

It is worth mentioning even at this point that the chuck body 2, or its sleeve part 9 carries at least one recess 27 at its end face facing the clamping ring 5. The recess 27 is formed such that the recess is accessible from the end face facing the clamping ring 5. The recess 27 is designed such that it comprises two sections 28 and 29 extending into the chuck body 2, or its sleeve part, to differing extents in the direction of the longitudinal axis L so that we can speak of a shallower section 28 and a deeper section 29. The function and purpose of this recess 27 and its individual sections 28 and 29 will be explained in more detail below. Ideally a plurality of such recesses 27 are provided uniformly spaced in the circumferential direction.

Figure 5:
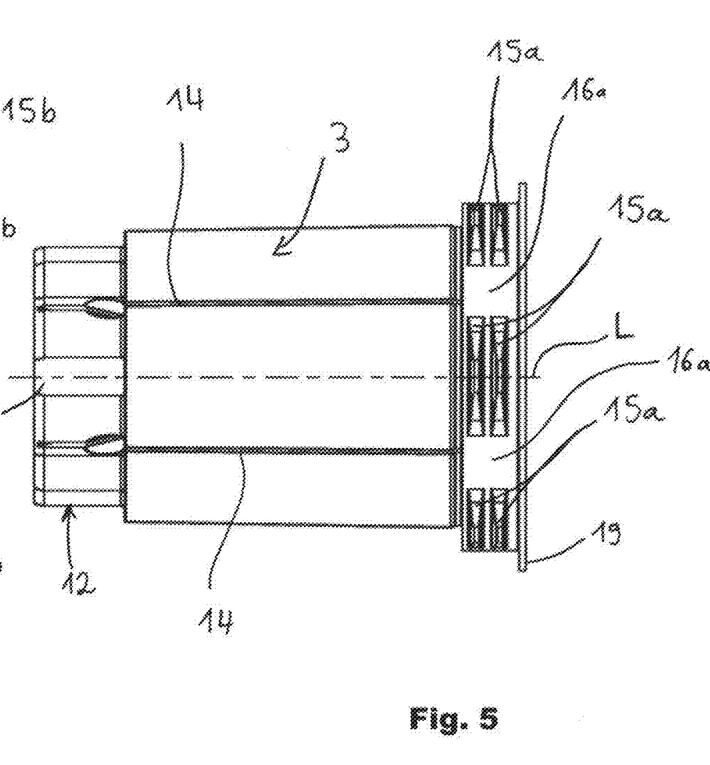
FIG. 5 is a sectional view of a collet associated with the collet chuck of FIG. 1 according to the present invention.
Figure 6:
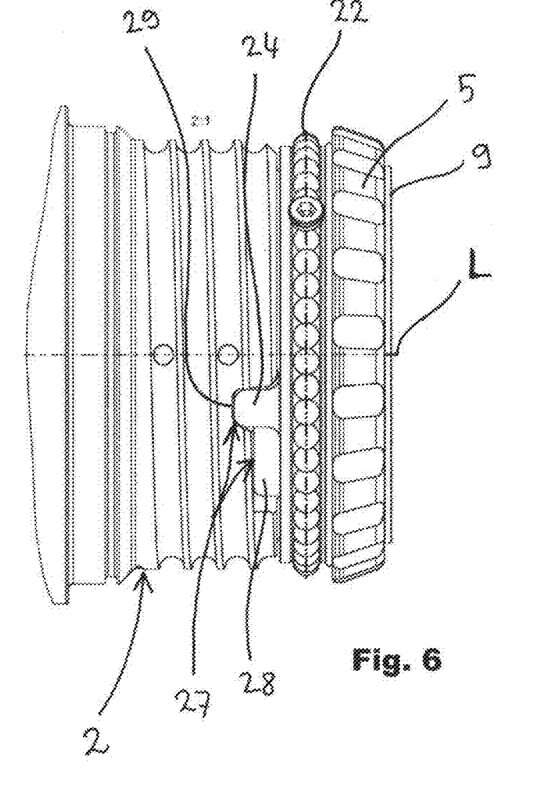
FIG. 6 shows which conditions prevail if only the clamping ring is set on the collet while the threaded section has been cut away.
Figure 10:
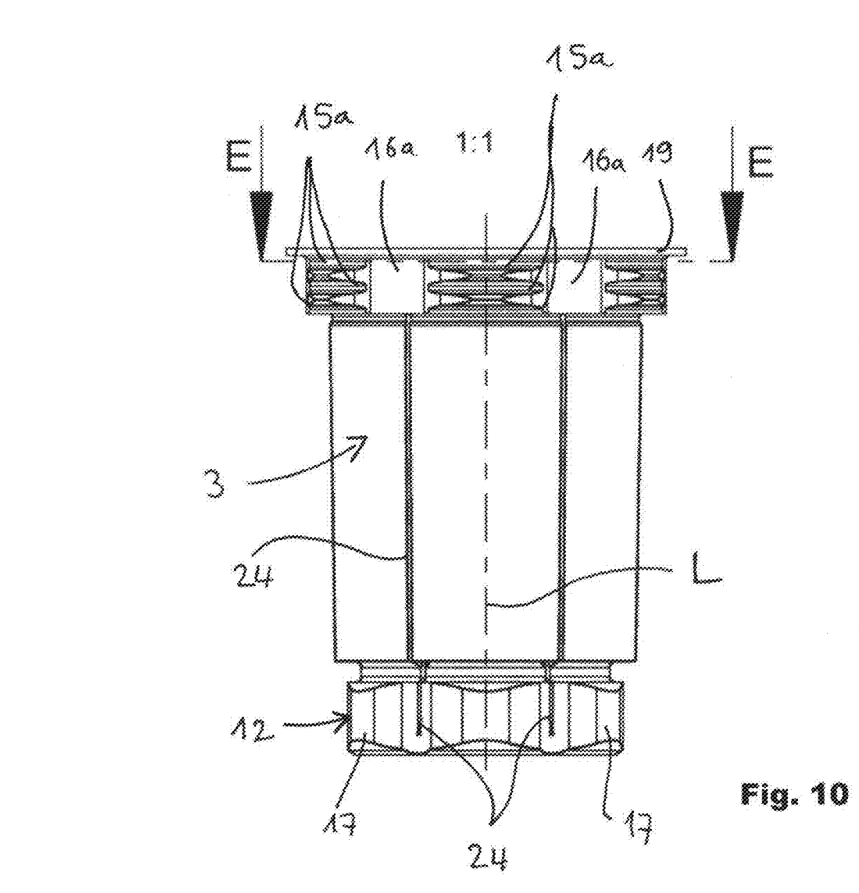
FIG. 10 shows a side view of a second embodiment of the collet provided for the collet chuck according to the present invention.
Figure 11:
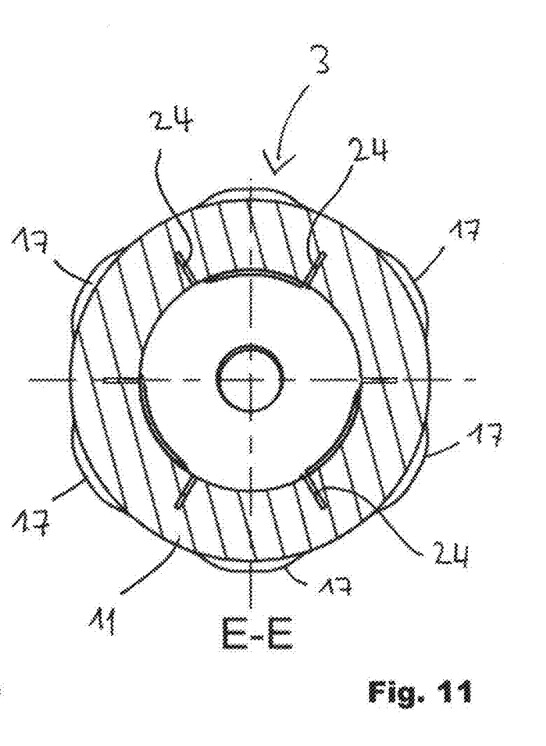
FIG. 11 is a sectional view perpendicular to the longitudinal axis along the line E-E according to FIG. 10.

The collet 3 is best understood with reference to FIG. 5 and FIGS. 10 and 11. As shown, the collet 3 consists of a collar section 11 and an end section 12. A clamping section 13 is formed therebetween. The collet, at its center, comprises a tool receiver 26, whose diameter is usually matched to a certain tool shank nominal diameter so that the latter can be tightly clamped, cf. FIG. 1.

The collar section 11 is usually formed as a ring that is completely closed in the circumferential direction and not completely but usually only partially slotted. This imparts great stability to the collar section so that it has a high centering ability.

Preferably, the end section 12 of the collet 3 is formed as a ring that is, again, not completely but mostly only partially slotted and, again, closed in the circumferential direction.

In contrast, the clamping section 13 is provided with slots 14 extending in a direction parallel to the longitudinal axis or alternatively (not shown) extending helically. The clamping section has a conical configuration at its external circumferential surface, usually with a cone tip angle between 2° and 10°.

The sleeve part 9 is conically formed in a complementary manner in the area of its collet housing 10. This means that the individual elements of the clamping section 13 are squeezed together in the radial direction when the collet 3 is driven into the collet housing 10 of the sleeve part in a direction parallel to the longitudinal axis L.

It should also be noted that the collet 3 is equipped with a plurality of collar-side protrusions 15a at the free external circumferential surface of its collar section 11. Herein, the free external circumferential surface is the circumferential surface of the collet which protrudes from the chuck body, or its sleeve part, even when the collet is completely closed.

The protrusions 15a are preferably designed such that preferably a plurality, mostly two or three, protrusions 15a are arranged in a line one behind the other in the direction of the longitudinal axis L. They are spaced in the direction of the longitudinal axis L and thus form a groove, or recess, between them, in which a corresponding counterpart of the clamping ring can be inserted.

As seen in the circumferential direction, protrusions directly adjacent to each other are separated from each other by a corridor 16a extending in a direction parallel to the longitudinal axis L. The width measured in the circumferential direction and depth in the radial direction of the corridor 16a are chosen such that the areas of the clamping ring forming the clamping ring-side protrusions 15b, to be described in more detail below, can be moved through the corridor 16a when they are brought into alignment with the latter in the direction of the longitudinal axis L. Herein, the corridor 16a is wider by no more than 15% in the circumferential direction than the protrusions 15b which it is designed to receive. In this way, a bearing capability of the protrusions 15a, 15b is achieved that is as high as possible, since it enables them to be in contact in the circumferential direction over the greatest possible length when the coupling is closed.

Each of the protrusions 15a preferably has the shape of a tooth protruding from the circumferential surface of the collar section 11 in the radial direction. Teeth adjacent to each other in the direction of the longitudinal axis L are usually parallel to each other. The teeth preferably comprise chamfered tooth flanks, i.e. their width measured in a direction parallel to the longitudinal axis L is reduced starting from the tooth base, where it is greatest, towards the radially free ending tooth head. In this way, a centering action is caused by the teeth, because the complementary protrusions 15b, yet to be more closely described, of the clamping ring 5 have a similar configuration. However, the contact surfaces formed by the tooth flanks enabling the teeth of the clamping ring and the collet to contact each other when the coupling is closed are aligned essentially perpendicular to the longitudinal axis of the collet chuck. The acute angle which they form with the longitudinal axis is preferably not smaller than 80°.

Ideally, each of the teeth additionally has two chamfered end faces, i.e. the narrow faces are chamfered so that the tooth base extends more in the circumferential direction than the tooth head. An end face of a tooth is that side which connects to tooth flanks facing each other and extending in the circumferential direction. Such a configuration facilitates bringing the teeth at the outer circumference of the collar section 11 of the collet 3 into and out of engagement with the corresponding teeth on the internal circumferential surface of the clamping ring 5.

The collet 3 and the chuck body 2 are equipped with interacting first and second interlocking elements 17 and 18. In the present case, the end section 12 of the collet 3 is formed to be such a first interlocking element 17. This is achieved by a configuration that is not circular, but at least locally deviates from the circular. The region of the collet housing 10 receiving the end section 12 has a complementary configuration and thus forms the second interlocking element 18 that receives, in an interlocking manner, the first interlocking element 17 abutting in the circumferential direction.

This helps to ensure that the collet can be inserted into the chuck body 2 in a single rotary position and thus in a position that is always the same relative to the chuck body 2, or at least it can be ensured that the collet 3 can be inserted into the chuck body 2 in different rotary positions all corresponding to each other so that the collet 3 will always come to lie in the chuck body 2 in the same manner regardless of which rotary position it assumes.

It should also be noted that the collar section 11 of the collet 3 is provided with a stop 19 protruding out of the collar section 11 in the radial direction. This stop 19 ensures that the collet can only ever be inserted into the multi-part clamping nut 4 from the side facing away from the clamping ring 5. The stop also covers the gap between the clamping ring 5 and the collar section 11 of the collet 3 otherwise open to the end face and thus guards against the intrusion of chips into the sensitive area in which the collet 3 is coupled to the clamping ring 5.

It should also be noted that at least one locking element 32 is arranged in the area of the tool receiver 26 of the collet. This locking element can engage a locking groove on the tool shank. This prevents the tool shank held in the—normally torque resistant—press fit from migrating in the direction parallel to the longitudinal axis when the collet is closed, because the vibrations arising during operation cause axial shank migration in minute steps despite the press fit.

Figure 4:
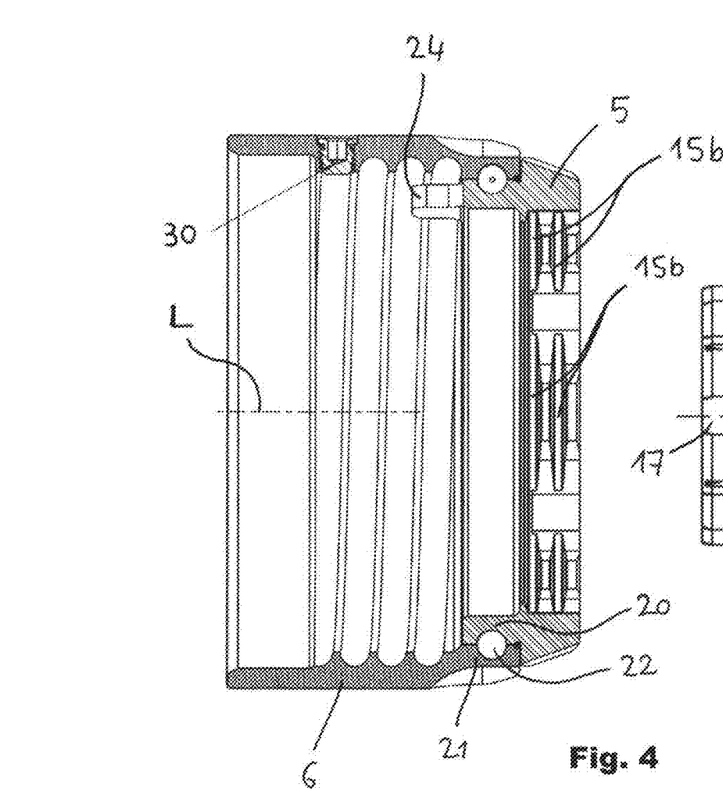
FIG. 4 is a longitudinal sectional view along the longitudinal axis L of the clamping nut according to FIG. 2.

FIG. 4 shows the configuration of the multi-part clamping nut 4 in detail. The multi-clamping nut 4 consists of a clamping ring 5 and a threaded section 6.

The threaded section 6 usually comprises an internal thread engaging an external thread machined into the chuck body, or its sleeve part, in a mostly integral manner. Preferably rolling elements (also not shown in figurative illustration) are held between the internal and the external thread so that only rolling friction arises in the thread thus formed. The rolling elements can be part of a recirculating-rolling elements system in which the rolling elements are transferred from one end of the thread to the other. Preferably the configuration is chosen in such a manner, however, that the rolling body facing the end of the thread (in the tightening direction of the threaded section) only reaches the end of the thread when the clamping nut is fully tightened. Depending on the actual application it is particularly preferred if the balls are installed without a cage, or with a cage, between the threaded section 6 and the clamping ring 5.

The clamping ring 5, at its internal circumferential surface, is provided with a plurality of clamping ring-side protrusions 15b. The clamping ring-side protrusions 15b are configured in such a manner, again, that a plurality of protrusions 15b is arranged in a line one behind the other in the direction of the longitudinal axis L. As seen in the circumferential direction, protrusions 15b directly adjacent to each other are separated by a corridor 16b extending in a direction parallel to the longitudinal axis L.

The width measured in the circumferential direction and the depth in the radial direction of the corridor 16b are chosen in such a manner that the above-described protrusions 15a of the collet can be moved through each of the corridors 16b when they have been brought into alignment with it in the direction of the longitudinal axis L. Herein, the corridor 16b is preferably no more than 15% wider in the circumferential direction than the protrusions 15a, which it is intended to receive. In this way, a bearing capability of the protrusions 15a, 15b that is as high as possible is achieved, as already mentioned above.

Each of the clamping ring-side protrusions 15b preferably comprises a design that is complementary to the design of the protrusions 15a of the collet. This ensures that the protrusions 15b of the clamping ring 5 can be threaded between the protrusions 15a of the collet in an ideally backlash-free way—i.e. preferably completely backlash-free, or even with a prestress to be created and released in a tool-less manner, or is at least essentially backslash-free (tolerances)—or vice versa. By these means, particularly good centering of the collet 3 is achieved within the clamping ring 5.

In a further embodiment, the distance of the clamping ring-side protrusions 15b parallel to the longitudinal axis L is slightly smaller than the distance of the collet-side protrusions 15a. It is thus achieved that the protrusions 15a and 15b come to lie against each other in an optimal manner during the elastic deformation occurring during tightening and can thus transmit maximum clamping force.

Moreover, the clamping ring 5 forms the inner ring 20 of a rolling bearing, usually on its side facing the chuck body.

The threaded section 6 forms the outer ring 21 of a rolling bearing—usually on its side facing away from the coupling section 7.

The rolling bearing inner ring 20 preferably integrally formed with the clamping ring 5 and the rolling bearing outer ring 21 preferably integrally formed with the threaded section 6 are connected to each other via rolling elements 22. The rolling elements usually establish an interlocking connection in the longitudinal direction L between the clamping ring 5 and the threaded section 6. For this purpose, the rolling bearing inner ring 20 and the rolling bearing outer ring 21 are each preferably provided with a completely closed rolling element groove extending in the circumferential direction, such as a groove forming a groove ball bearing. The rolling elements 22 are preferably inserted into this rolling element groove 23 without the use of a cage.

This ensures that strong forces can be transmitted between these two components while, at the same time, the threaded section 6 can be rotated with respect to the clamping ring 5 essentially without friction.

The number of rolling elements 22 is preferably chosen such that the rolling element groove is filled with rolling elements to such an extent that the distance of directly adjacent rolling elements is smaller than the extension of a rolling element in the circumferential direction along the rolling element grooves, ideally by about 50%, more preferably by about 75%. By filling the rolling element grooves 23 in such a manner with such a great number of rolling elements asymmetrical distribution of the rolling elements along the rolling element groove is largely avoided. This ensures that great forces acting in the direction of the longitudinal axis L can be permanently transmitted between the clamping ring 5 and the threaded section 6 without having to fear fatigue damage. Moreover, formation of an imbalance due to rolling elements being asymmetrically distributed within the groove can be largely avoided.

Finally, either the clamping ring 5 or the threaded section 6 comprises a recess through which the rolling elements 22 can be inserted into the hollow space formed by the rolling element grooves 20 and 21, formed between the threaded section 6 and the clamping ring 5, when they have been set one within the other in the operating position. The recess can be closed after insertion of the rolling elements 22 preferably by means of a screw. In this way, the clamping ring and the threaded section are permanently connected to each other, which means that they cannot be separated one from the other without the use of a tool.

Figure 2:
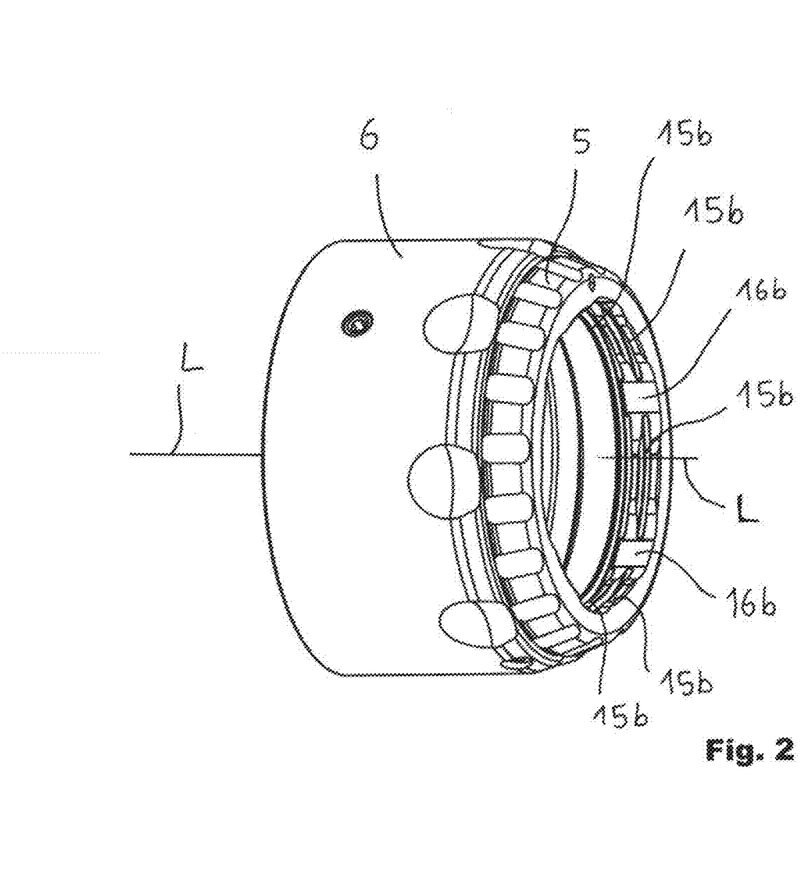
FIG. 2 is a detailed view, obliquely from the side, of the two-part clamping nut associated with the collet chuck according to the present invention.
Figure 3:
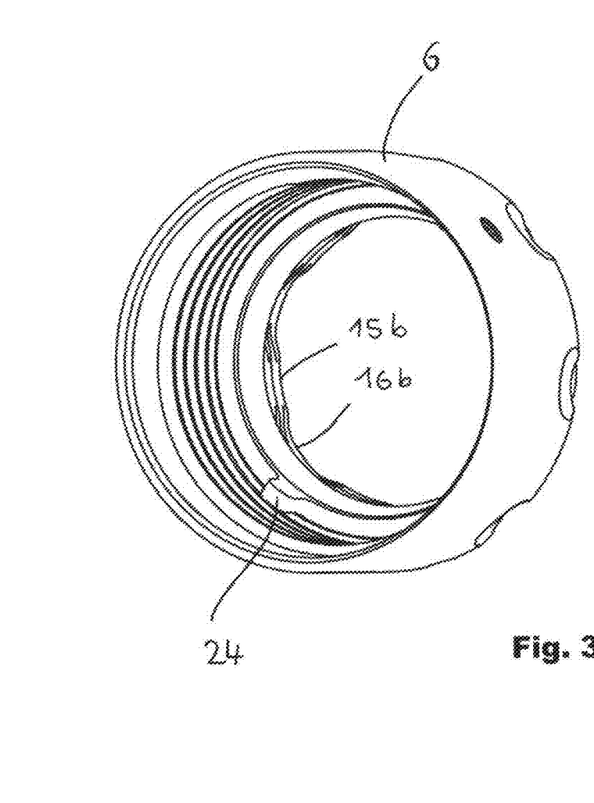
FIG. 3 shows the clamping nut according to FIG. 2 obliquely from behind.

It should be noted even at this point that the clamping nut, at its end face facing the flange 8 of the chuck body 2, comprises at least one or a plurality of stops preferably evenly spaced in the circumferential direction. This stop forms a third interlocking element and is preferably formed as a protrusion or nose 24 which protrudes beyond said end face of the clamping ring in the direction of the longitudinal axis L. The special function of this nose will be explained later.

For the sake of completeness, it should be noted that the protrusions 15a can alternatively also be formed as protrusions radially protruding towards the inside from the internal circumferential surface. In this case the clamping ring bears the protrusions 15b.

The protrusions 15a and the protrusions 15b preferably form the coupling according to the invention.

Figure 12:
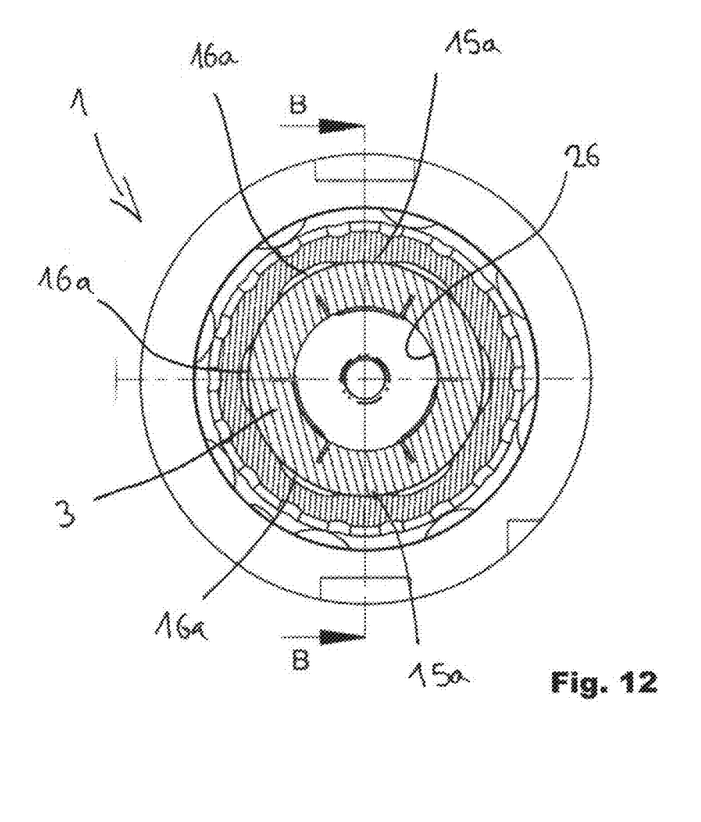
FIG. 12 is a sectional view perpendicular to the longitudinal axis of the collet chuck shown in FIG. 14.
Figure 13:
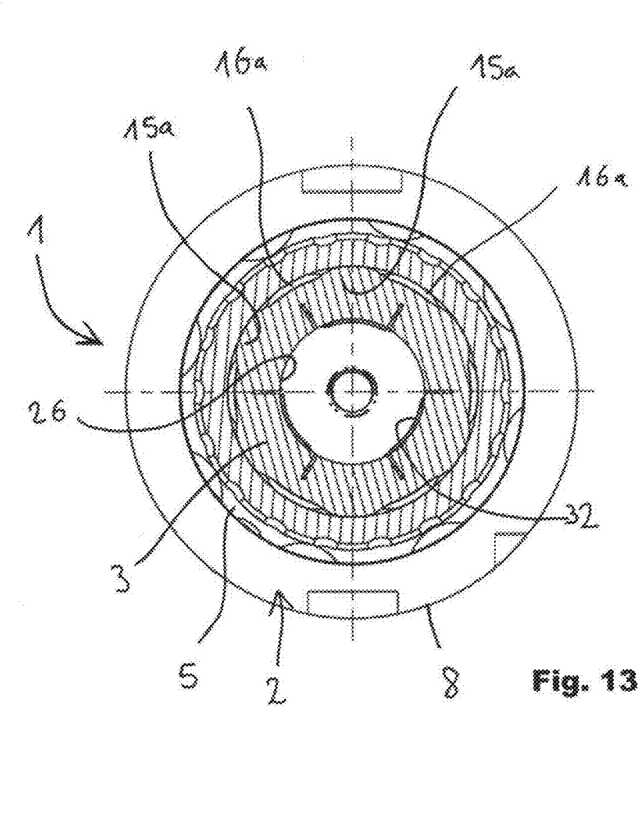
FIG. 13 is a sectional view perpendicular to the longitudinal axis of the collet chuck shown in FIG. 14 in a different plane.
Figure 14:
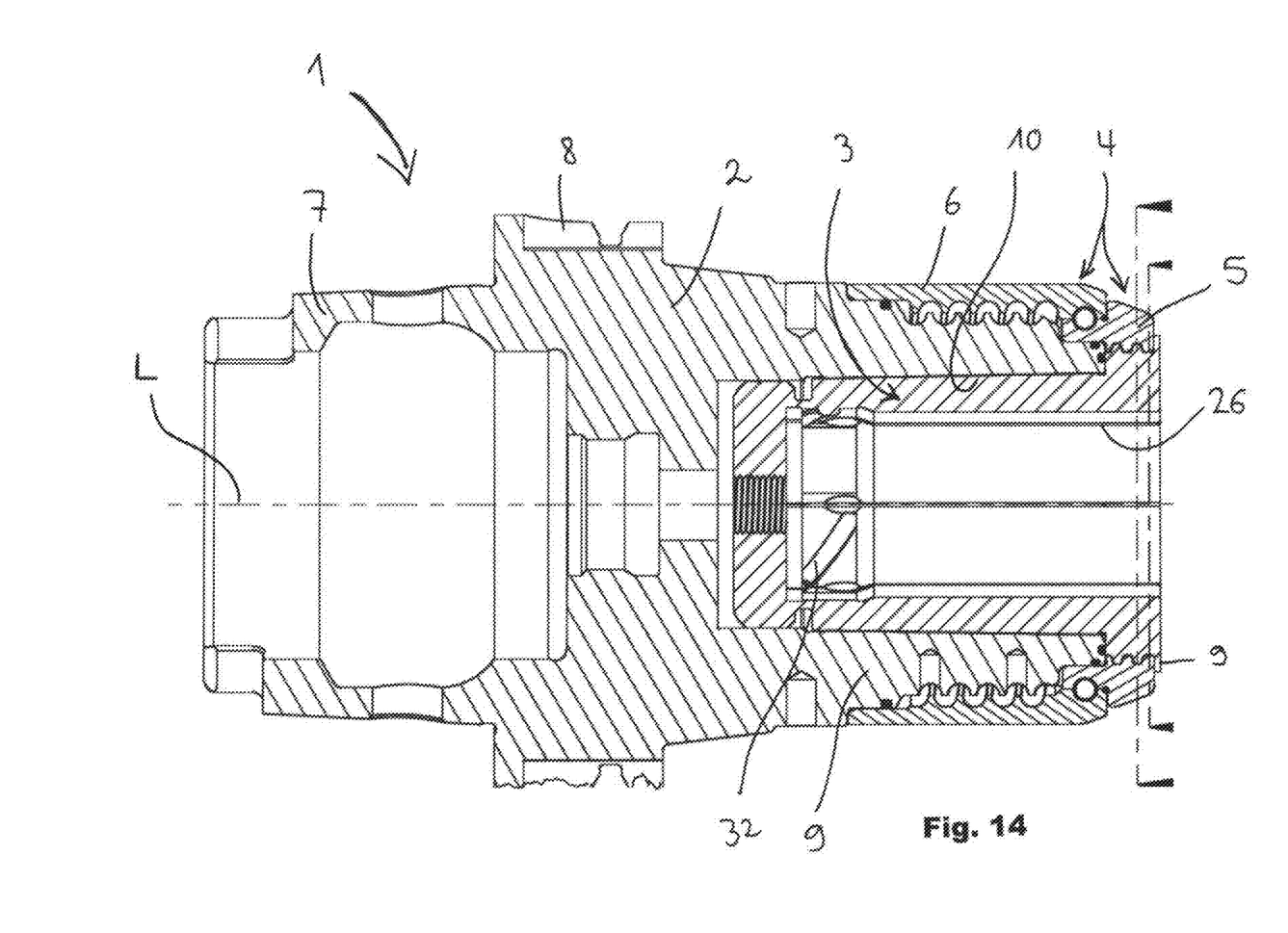
FIG. 14 is a sectional view along the longitudinal axis L of another embodiment of a collet chuck according to the present invention.

The way in which the protrusions 15a, 15b interact with each other to thus form the coupling according to the invention is best shown in FIGS. 14, 12 and 13—wherein the two latter figures show sections along the section lines shown in FIG. 14.

Preferably the protrusions 15a and the protrusions 15b are made with sufficient precision so that the coupling, in the closed condition, establishes not only an interlocking connection in the longitudinal direction L between the collet and the clamping ring but also centers the collet with respect to the clamping ring in an interlocking engagement.

Ideally the coupling, or its protrusions, always force the clamping nut and the collet to assume the position relative to each other in which the central longitudinal axis of the collet and the central longitudinal axis of the clamping ring relative to each other have a positional difference of no more than $4/100$ mm, more preferably of no more than $2/100$ mm.

The fact that the clamping ring and the threaded section are connected with each other via rolling elements (more to follow) also helps to establish exceptionally good centering of the collet. The corresponding applies when the threaded section 6, to be described in more detail, in turn, is rotatably supported on the chuck body via rolling elements.

To be able to install a collet which is necessary to clamp a certain tool shank nominal diameter with the actually present collet chuck the procedure is as follows:

The clamping ring 5 is still screwed on the sleeve part 9 of the chuck body 2 via the threaded section 6 holding it. The collet housing is empty.

The collet to be newly installed is oriented such that its collet-side protrusions 15a are in alignment with the corridors 16b in the clamping nut. At the same time, its corridors 16a are in alignment with the clamping ring side protrusions 15b. In this alignment, the collet can be inserted into the collet housing through the central opening of the clamping ring. This automatically brings the interlocking elements 17, 18, if any, of the collet 3 into engagement with the collet housing 10 in such a manner that the collet can be inserted into the collet housing 10 until it reaches the stop.

However, the threaded section 6 cannot be tightened yet, or not yet completely. The reason is because the above-explained third and fourth interlocking elements prevent this. The third interlocking element, such as in the shape of the above explained protrusion, or the nose 24 preferably forming it, still protrudes at that time into the first, shallower section 28 of the recess 27 forming, for example, the fourth interlocking element. Therefore, as soon as tightening is attempted, the third interlocking element will abut against the fourth interlocking element, for example against the bottom of the shallower section 28 of the recess 27 after a very short time (as seen in the direction of the longitudinal axis L).

To enable tightening of the threaded section 6, the clamping ring must be rotated up to a point (here in the tightening direction of the clamping nut 4) where the protrusion forming the third interlocking element, or the nose 24 forming it, is in complete or at least essential, alignment, within tolerance, with the deeper section 29 of the recess 27 forming the fourth interlocking element in the direction of the longitudinal axis L. This can be helped by chamfered flanks of the nose 24 eliminating smaller positional deviations of the nose 24 during tightening, because the nose will be forced to assume its optimal position during tightening.

This rotation of the clamping ring closes the coupling according to the invention, because the protrusions 15a are displaced in the circumferential direction in such a manner that they are in, usually complete, alignment with the collet-side protrusions in the direction of the longitudinal axis. Herein, the collet-side protrusions 15a form the first part of the coupling, and the clamping ring-side protrusions 15b form the second part of the coupling.

The coupling is designed such that a purely interlocking connection is established via which forces can be transmitted both in a first direction along the longitudinal axis L and in a second opposite direction. This ensures bidirectional coupling of the collet 3 to the clamping ring 5 in both directions of the longitudinal axis L by means of the coupling. By tightening the clamping ring 5 by means of the threaded section 6, yet to be described in more detail, the collet can be driven in. By pressing off the clamping ring 5 from the chuck body 2 by means of the threaded section 6, the collet can be withdrawn again from the chuck body, and thus opened.

Herein, the interaction of the protrusion forming a third interlocking element, or the nose 24, and the specially designed recess 27 forming a fourth interlocking element ensures that the threaded section 6 can only be tightened when the coupling is completely closed. This prevents the application of forces, generated by the tightening of the threaded section while the coupling has inadvertently only been half closed, which would overload the coupling elements and lead to local damage on the coupling.

If the threaded section 6 is tightened after the correct rotation of the clamping ring 5, the clamping ring is forced to move in the direction of the longitudinal axis L towards the sleeve part 9. The protrusion, or the nose 24, is thereby smoothly immersed ever deeper into the deeper section 29 of the recess 27 until the clamping ring contacts the free end face of the sleeve part and thus abuts against the stop. Herein, the collet 3 is driven into the collet housing 10 of the sleeve part 9 to a sufficient depth for the collet to apply the forces needed for secure holding of the tool shank.

Advantageously, a stop or, in particular, a stop pin 30 is installed in the region of the threaded section 6, which prevents the threaded section from being tightened further or further to a damaging extent, when the clamping ring abuts against the free end face of the sleeve part. This prevents damage due to inadvertent "overtwisting" of the threaded section. This is important since in the area of the threaded section and its rolling engagement the frictional forces are usually reduced to such an extent that they alone cannot securely prevent overtwisting.

In an alternative embodiment, the threaded section 6 can serve as a limit for tightening the clamping nut by having its end face S abut on a shoulder 33, cf. FIG. 1, of the chuck body 2.

Ideally the deeper section 29 of the recess 27 is designed such that it keeps the protrusion or the nose 24 trapped in an interlocking engagement against movement in both circumferential directions when the threaded section 6 is fully tightened. This prevents a situation in which the clamping ring, for example due to the vibrations arising during machining with the collet chuck (such as due to the quickly changing number of tool cutting edges currently in engagement with the workpieces to be machined) inadvertently starts rotating, mostly in small steps, "creeping", and thus the coupling wholly or partially opens, which can lead to danger or damage.

To release the collet holding a tool shank in a clamped state and to be able to change the tool and the collet, the procedure is as follows:

The threaded section 6 is unscrewed. Due to the fact that it is connected to the clamping ring via the rolling bearing in an interlocking manner in such a way that it is able to transmit forces to the clamping ring 5 in all directions parallel to the longitudinal axis L, it presses off the clamping ring 5 from the free end face of the sleeve part 9. The protrusion, or the nose 24, of the clamping ring is thus lifted out of the deeper section 29 of the recess 27 to such an extent that the clamping ring 5 is no longer locked against rotation in an interlocking manner. Thereafter, the clamping ring 5 can be rotated in such a way that its protrusion, or its nose 24, is transferred into the shallower section 28 of the recess 27, preferably until a flank of the protrusion, or the nose 24, abuts against the lateral boundary of the shallower section 28 of the recess 27. This signals and ensures that the coupling is now fully open, since the protrusions 15a no longer engage the protrusions 15b. A particularly advantageous effect of this is that the coupling can be opened and closed by the operator by hand without having to resort to the use of a tool for opening and closing the coupling.

The collet 3—in the reverse of what was described for its installation—can now be withdrawn through the central opening of the clamping ring 5 out of the sleeve part, until it is completely removed and thus free.

Herein, the threaded section 6 is prevented, preferably by means of a stop, in particular in the shape of a stop pin 30, from being completely unscrewed from the sleeve part. The threaded section and the chuck body are preferably not separable from each other without tools, which prevents inadvertent dismantling and the thus attendant undesirable intrusion of dirt. In contrast to the tools, or collets, of the prior art, the collet can be exchanged without completely unscrewing the threaded section from the sleeve part, or the chuck body.

The stop pin 30 has also the effect that the rolling elements cannot be distributed at random along the thread groove when the threaded connection is formed as a rolling element thread. With each loosening of the clamping nut the rolling elements will form a queue against the stop pin 30 so that they are adjacent to each other and they are at a well-defined starting position for the following clamping process.

From the above it can be derived that the chuck according to the present invention can be extremely securely operated in its preferred embodiment despite its complex structure. Even an unskilled operator can and must only work from stop to stop. The correct installation position of all parts relative to each other and correct closure of the coupling are always forcibly achieved by the above-described interlocking parts.

Figure 8:
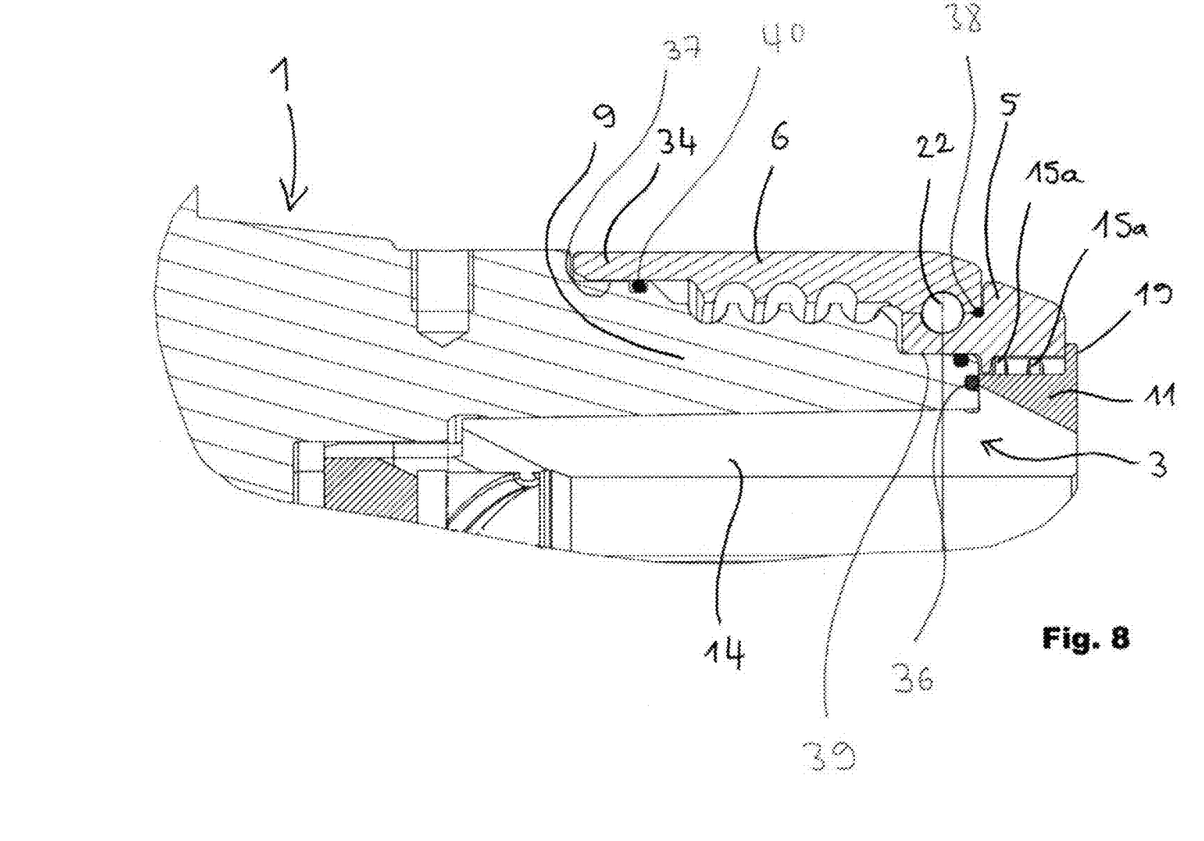
FIG. 8 shows an enlarged detail from the top region of FIG. 1.
Figure 9:
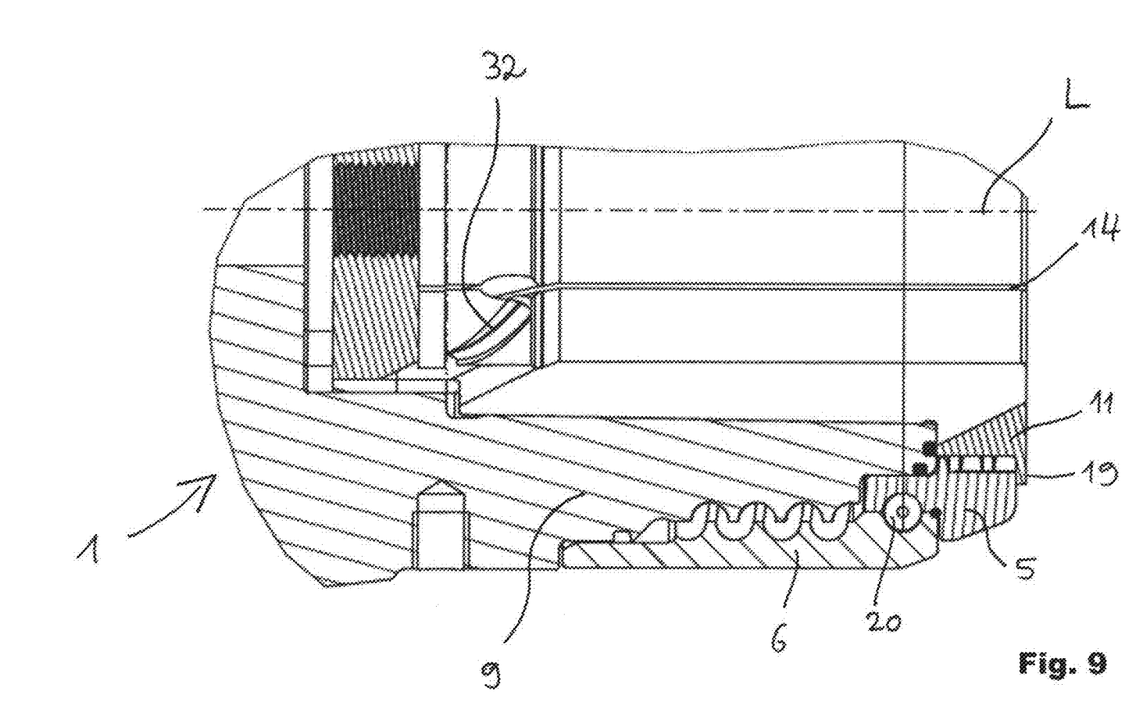
FIG. 9 shows an enlarged detail from the bottom region of FIG. 1.

A particularly advantageous exemplary embodiment for the seal of the collet chuck is shown in FIG. 8. FIG. 8 shows an enlarged detail of a longitudinal section of the collet chuck. One of the slots 14 of the collet chuck is sectioned in the present drawing. It can be seen that the slot does not fully extend into the region of the collar section 11. The collar section 11 is at least partially closed in the circumferential direction, in particular at its outer circumference, which is where the coupling according to the invention is formed.

The region of the collar section 11 closed in the circumferential direction contacts the free end of the chuck body 2 which borders the collet housing 10. Preferably, the free end of the chuck body 2 is provided with a groove 36 surrounding it in the circumferential direction. The sealing ring, such as a cord seal, is inserted therein. This prevents chip particles from entering into the region of the collet housing 10 where they could cause problems later. On the other hand, whenever the tool has lubricoolant supplied to it through the collet 3, lubricoolant is prevented from leaking at this point.

It can also be seen that the chuck body 2, in the region of its free end, preferably has a plateau 39 with a preferably uniformly reduced diameter which usually guides the clamping ring 5 which overlies it with its internal circumferential surface. The plateau 39 is also provided with a surrounding groove at its external circumferential surface. A further sealing ring, generally also a cord seal, is inserted in this groove. This prevents small chip particles and/or lubricoolant from passing through the region of the coupling into the region of the thread of the threaded section 6 and there leading to wear and tear. A plateau in the present context is a shaft shoulder with a constant diameter over a certain range in the longitudinal direction.

The same purpose is served by a further sealing ring 38 held between the clamping ring 5 and the threaded section 6. As shown, the internal circumference of the threaded section 6 overlies the external circumference of the clamping ring 5 so that, in the overlapping region, the above-described rolling bearing can be formed, which connects the clamping ring 5 and the threaded section 6 in an interlocking manner. Said sealing ring prevents lubricoolant or small particles from passing through the gap between the clamping ring 5 and the threaded section 6 up to the region of the rolling bearing, or even beyond that into the region of the thread.

As shown, the threaded section 6 also comprises a cylindrical extension forming a type of skirt 34 at the side facing away from the free end of the chuck body. The internal circumference of this skirt overlies a corresponding plateau 37 of the chuck body which usually has a constant diameter, just like the counterpart on the threaded section 6. Here, a circumferential groove is also provided on the chuck body (or, as the case may be, in the threaded section instead). A sealing ring 40 is inserted in this groove, preferably also in the form of a cord seal. The skirt 34 is designed such that it is always in contact with the sealing ring. It is easily understandable that this establishes a permanent sealing effect regardless of the rotary position assumed by the threaded section 6 (with the collet tightened or loosened).

It can be easily derived from FIG. 8 that the seal is configured in such a manner that the thread between the chuck body and the threaded section 6 is always sealed even when the collet has been removed. This is a substantial advantage not only, but in particular also, when the threaded section 6 is guided on the counter thread of the chuck body 2 by means of rolling elements.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

LIST OF REFERENCE NUMERALS 1 collet chuck
2 chuck body
3 collet
4 multi-part clamping nut
5 clamping ring
6 threaded section
7 coupling section for coupling the collet chuck to the machine tool
8 flange
9 sleeve part
10 collet housing
11 collar section
12 end section
13 clamping section
14 slot
15a protrusions of the collet
15b protrusions of the clamping ring
16a corridor on collet
16b corridor on clamping ring
17 first interlocking element 18 second interlocking element
19 stop
20 inner ring of a rolling bearing
21 outer ring of a rolling bearing
22 rolling element
23 -
24 nose
25 -
26 tool receiver
27 recess
28 first section of recess
29 second section of recess
30 stop pin to prevent complete unscrewing of the threaded nut
31 -
32 locking element
33 shoulder
34 skirt
35 -
36 groove on free end of chuck body
37 plateau
38 further sealing ring held between the clamping ring 5 and the threaded section 6
39 plateau
40 sealing ring
L longitudinal axis
S end face

We claim:

1. A collet chuck for clamping a tool shank, comprising: a chuck body, a collet and a multi-part clamping nut consisting of a clamping ring and a threaded section, which are rotatably connected to each other via rolling elements and which are apart from that connected to each other in an interlocking manner, wherein the clamping ring and the collet comprise interlocking coupling elements designed such that the collet can be inserted into the collet housing through the central opening, facing away from the chuck body, of the clamping ring held on the chuck body, while the coupling elements move past each other, and then the coupling elements can be brought into engagement with each other by rotating the clamping ring relative to the collet, so that the clamping ring can transmit the forces applied to it by the threaded section during tightening to the collet via the coupling element and can drive the collet into the chuck body, wherein the clamping ring is rotatable relative to the collet.

2. The collet chuck according to claim 1, wherein the coupling elements are designed such that the threaded section also transmits forces via the coupling elements to the collet during loosening, which release the collet from the collet housing.

3. The collet chuck of claim 1, wherein the coupling elements can be brought into and out of engagement without the use of tools, to install the collet in and to release it from the chuck body.

4. The collet chuck of claim 1, wherein the coupling elements form a bayonet lock.

5. The collet chuck of claim 1, wherein the coupling elements consist of a plurality of protrusions on the clamping ring and on the collet each separated from each other by a corridor in the circumferential direction.

6. The collet chuck of claim 5, wherein the protrusions are formed as teeth with chamfered tooth flanks.

7. The collet chuck of claim 6 wherein the teeth have chamfered free end faces.

8. The collect chuck of claim 5, wherein the protrusions are formed as teeth with chamfered tooth flanks and interact with each other via contact surfaces forming an acute angle (in cross-section) of $\geq 80°$ with the longitudinal axis (L) of the collet chuck.

9. The collet chuck of claim 8 wherein the teeth have chamfered free end faces.

10. The collet chuck of claim 1, wherein the collet and the chuck body have interacting first and second interlocking elements which ensure that the collet can only be inserted in the chuck body in one or more predefined rotational positions, and the clamping ring and the chuck body each have at least one third and fourth interlocking element, which interact in such a manner that the clamping ring can only drive the collet into the chuck body if the clamping ring assumes a certain position relative to the chuck body and thus relative to the collet.

11. The collet chuck of claim 10, wherein the third and fourth interlocking elements are designed thus that the clamping ring is fixed in a manner that prevents clockwise and anticlockwise rotation when the threaded section has been tightened.

12. The collet chuck of claim 11, wherein the third and fourth interlocking elements are designed thus that the clamping ring is released by partially loosening the threaded section from the chuck body to such an extent that it can be sufficiently rotated with respect to the chuck body to open the coupling so that the collet can be removed from the chuck body via its central opening.

13. The collet chuck of claim 12, characterized in that the third and fourth interlocking elements form first and second stops between which the clamping ring can be rotated back and forth when the threaded section has been partially loosened, wherein the first stop defines the position of the clamping ring in which the coupling elements on the collet and the clamping ring are in complete engagement, so that the collet can be driven into the chuck body, and the second stop defines the position of the clamping ring in which the coupling elements are completely out of engagement.

14. A clamping nut, characterized in that the clamping nut comprises the relevant features of claim 1.

* * * * *